US005653294A

United States Patent [19]

Thurler

[11] Patent Number: 5,653,294

[45] Date of Patent: Aug. 5, 1997

[54] IMPACT MECHANISM FOR A HAMMER DRILL

[75] Inventor: James E. Thurler, Pickens, S.C.

[73] Assignee: Ryobi North America, Easley, S.C.

[21] Appl. No.: 692,572

[22] Filed: Aug. 6, 1996

[51] Int. Cl.[6] .......... B23B 45/02

[52] U.S. Cl. .......... 173/48; 173/216; 173/217; 173/13

[58] Field of Search .......... 173/48, 47, 216, 173/217, 109, 114, 93.5, 205, 13

[56] References Cited

U.S. PATENT DOCUMENTS

| | | | |
|---|---|---|---|
| 3,789,933 | 2/1974 | Jarecki | 173/48 |
| 3,799,275 | 3/1974 | Plattenhardt et al. | 173/48 |
| 3,809,168 | 5/1974 | Fromm | 173/13 |
| 3,867,988 | 2/1975 | Koehler | 173/48 |
| 4,098,351 | 7/1978 | Alessio | 173/13 |
| 4,229,981 | 10/1980 | Macky | 173/48 |
| 4,418,766 | 12/1983 | Grossmann | 173/13 |
| 4,489,792 | 12/1984 | Fahim et al. | 173/48 |
| 4,529,044 | 7/1985 | Klueber et al. | 173/48 |
| 4,567,950 | 2/1986 | Fushiya et al. | 173/48 |
| 5,415,240 | 5/1995 | Mundjar | 173/48 |
| 5,447,205 | 9/1995 | Thurler | 173/48 |
| 5,494,115 | 2/1996 | Hwong | 173/13 |

*Primary Examiner*—Joseph J. Hail, III
*Assistant Examiner*—Jay A. Stelacone
*Attorney, Agent, or Firm*—Brooks & Kushman P.C.

[57] ABSTRACT

A hammer drill has a motor disposed in a housing, and the motor has a rotatable armature shaft. A pinion at an end of the armature shaft drives an axially displaceable intermediate gear mounted on an intermediate shaft. An intermediate pinion is mounted for rotation with the intermediate gear and drives an output gear fixed about the midsection of an axially displaceable output shaft. The intermediate gear has input and output faces. The input face is associated with a first cam mechanism for generating reciprocating motion. The output face is engageable with an impact face of the output gear to transmit axial displacement therebetween. A second cam mechanism is affixed to the housing and axially spaced from the first cam mechanism. The first and second cam mechanisms are engageable by sufficiently axially displacing the output shaft so that the output gear impact face abuts the intermediate gear output face axially displacing the intermediate gear so that the first and second cam mechanisms abut each other. The first and second cam mechanisms are configured with respect to each other to generate reciprocating motion and cause the intermediate gear to reciprocate axially as the first cam mechanism rotates relative to the second cam mechanism while the first and second cam mechanisms are engaged. The output face of the intermediate gear transmits the reciprocating motion to the output gear impact face to axially reciprocate the output shaft as it rotates.

20 Claims, 2 Drawing Sheets

IMPACT MECHANISM FOR A HAMMER DRILL

TECHNICAL FIELD

The present invention relates to hammer drills, and more particularly, to an impact mechanism for a hammer drill.

BACKGROUND ART

When drilling through hard surfaces such as rocks or stone, many times it is desirable to impart a reciprocating motion to the drill bit to facilitate drilling. This hammering motion of the drill bit helps break up the material while the rotating of the drill bit allows the broken up material to be removed from the hole being drilled.

A conventional hammer drill has a motor disposed in a housing, and the motor includes an armature shaft having a pinion at its end. The pinion drives an output gear that is fixed about the output shaft of the hammer drill in the case of a single reduction drill. In the case of a double reduction drill, the pinion drives an intermediate shaft which in turn drives the output shaft. A drill chuck is mounted on the output shaft to receive a drill bit. An impact mechanism which provides the hammering action is associated with the face of the output gear. A ratchet face or similar mechanism on the face of the output gear abuts a cooperating mechanism that is affixed to the drill housing. A reciprocating motion is then imparted to the drill bit when the output shaft rotates.

It is also well known in the art to provide hammer drills with the capability to switch between a conventional drilling mode, with rotation only, and a hammer drilling mode employing conventional drill rotation along with a hammer action. The hammer drill is capable of switching between the two modes, and thus eliminates the need for a separate conventional drill. An example of an adjustment mechanism for switching between conventional drilling mode and hammer drilling mode is disclosed in U.S. Pat. No. 5,447,205 assigned to the assignee of the present invention which is incorporated herein by reference.

A primary disadvantage associated with existing impact mechanisms for hammer drills is the fact that in order to accomplish a desired high blows per minute (BPM) for efficient hammer drill performance, an undesirable high output speed is required. High BPM can also be achieved by increasing the number of ramps on the impact mechanism. However, an increased number of impact ramps tends to produce a "skipping" effect and efficiency loss due to the smaller area of surface contact for each ramp.

SUMMARY OF THE INVENTION

It is, therefore, an object of the present invention to provide a hammer drill that accomplishes desired high blows per minute (BPM) without requiring an undesirable high output speed.

It is another object of the present invention to provide a hammer drill incorporating the impact mechanism into an intermediate gear, allowing the number of ramps that provide the reciprocating motion to be reduced, thus increasing the area of surface contact for each ramp.

In carrying out the above objects and other objects and features of the present invention, a hammer drill and an impact mechanism for a hammer drill are provided. The hammer drill includes a motor disposed in a housing, and the motor includes a rotatable armature shaft having an armature pinion at one of its ends. An axially displaceable output shaft has first and second ends, a midsection between its ends, and an axis of rotation. The first end of the output shaft is adapted to receive a drill chuck. An output gear is fixed about the midsection of the output shaft to rotate coaxially with the output shaft.

An axially displaceable intermediate gear is mounted on an intermediate shaft and is driven by the armature pinion. The intermediate gear has input and output faces. The input face is associated with a first cam mechanism for generating reciprocating motion. The output face is engageable with an impact face of the output gear. Engagement of the output and impact faces transmits axial displacement between the intermediate and output gears.

An intermediate pinion is mounted on the intermediate shaft to rotate with the intermediate gear. The intermediate pinion drives the output gear and causes gear reduction between the intermediate shaft and the output shaft.

A second cam mechanism is affixed to the housing and axially spaced from the first cam mechanism. The first and second cam mechanisms are engageable by sufficiently axially displacing the output shaft so that the output gear impact face abuts the intermediate gear output face while the first and second cam mechanisms abut each other. The first and second cam mechanisms are configured to generate reciprocating motion and cause the intermediate gear to reciprocate axially as the first cam mechanism rotates relative to the second cam mechanism. The output face of the intermediate gear transmits the reciprocating motion to the impact face of the output gear thereby axially reciprocating the output shaft as it rotates.

The advantages accruing to the present invention are numerous. For example, the hammer drill of the present invention provides desired high blows per minute (BPM) for efficient hammer drill performance without requiring an undesirable high output speed or costly two-speed gear train. Because of the higher RPM at the intermediate stage, the number of ramps that control the axial movement which produces the hammering action can be reduced. This allows a greater degree of ramp surface area contact with every revolution and reduces the "skipping" effect and efficiency loss found in many high speed hammer drills.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
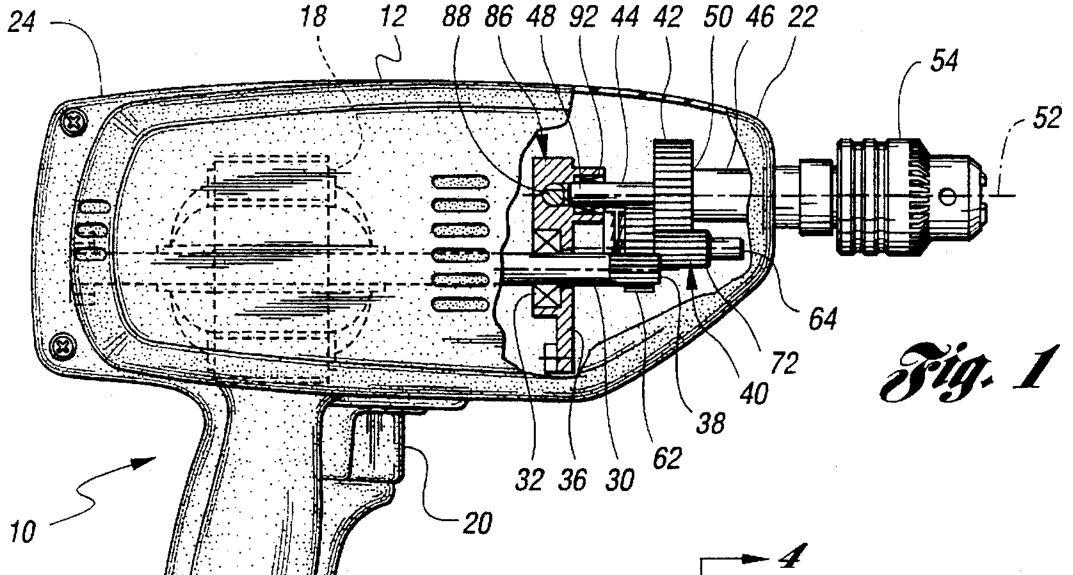
FIG. 1 is a side elevation view, in partial section, of a hammer drill in accordance with the present invention.

Referring now to FIG. 1, a hammer drill is generally indicated at 10. The hammer drill 10 includes a housing 12 having a pistol grip handle 14. The lower end of housing 12 receives an electrical cord 16. The electrical cord 16 is adapted to be connected to a suitable power source that powers a motor 18. The cord 16 is in circuit with a trigger switch 20 on the handle 14 of housing 12. Of course, the present invention is equally useful with a battery powered cordless hammer drill. The trigger switch 20 selectively supplies power to the motor 18. A suitable speed control device (not shown) for controlling motor speed can also be included in a circuit connected to trigger switch 20, if so desired.

Referring to FIGS. 1–4, the housing 12 has a front or forward portion 22, and a back or rearward portion 24. When referring to forward or rearward herein, forward refers to an element that is closer to the end of the drill that engages a workpiece than another object. The motor 18 is connected to a rotatable armature shaft 30 at the rearward end of armature shaft 30. The armature shaft 30 is supported at its forward portion by a ball bearing 32. The ball bearing 32 is secured in place and supported by a bearing plate 36 which is affixed to the housing 12. An armature pinion 38 is located at the forward end of armature shaft 30.

An intermediate gear assembly, generally indicated at 40, operatively connects armature pinion 38 to an output gear 42 to drive spindle shaft or output shaft 44. Output shaft 44 has first and second ends 46 and 48, respectively, and a mid-section 50 between its ends. Output gear 42 is fixed about midsection 50 of output shaft 44 to rotate coaxially with output shaft 44 about its axis of rotation 52.

First end 46 of output shaft 44 protrudes from housing 12 and attaches to a conventional drill chuck 54. Drill chuck 54 is adapted to retain a tool bit (not shown) that engages various workpieces.

Figure 2:
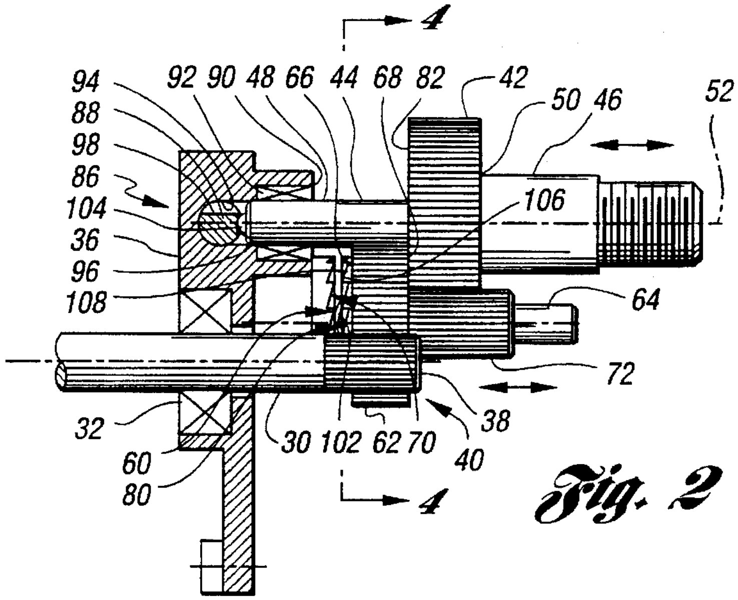
FIG. 2 is a side elevation view, on an enlarged scale, of an impact mechanism in the conventional drilling mode in accordance with the present invention.
Figure 3:
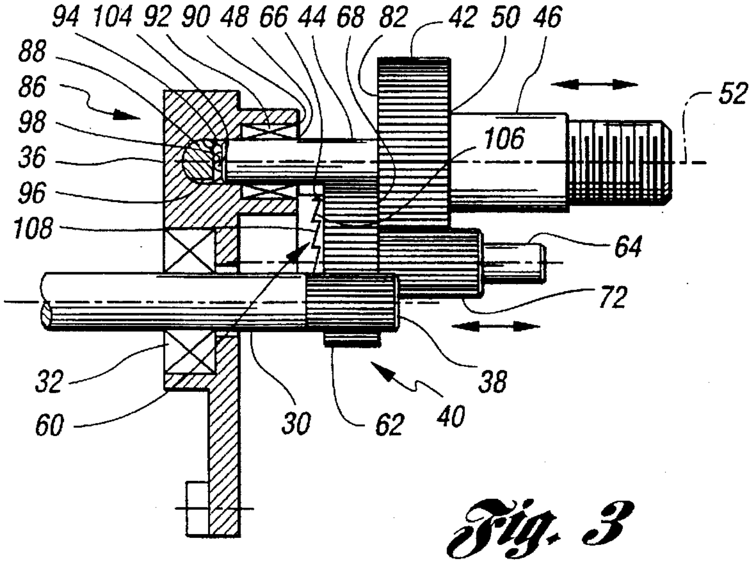
FIG. 3 is a side elevation view, on an enlarged scale, of an impact mechanism in the hammer drilling mode in accordance with the present invention.
Figure 4:
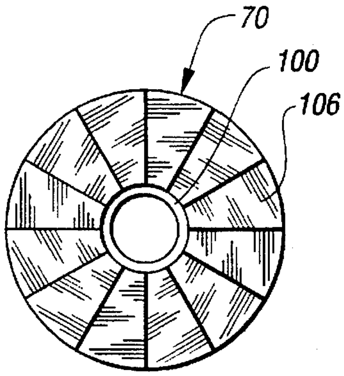
FIG. 4 is a side view the intermediate gear showing its input face.

Referring now to FIGS. 2–4, an impact mechanism 60 of hammer drill 10 will be described. An axially displaceable intermediate gear 62 is mounted on an intermediate shaft 64 and is driven by armature pinion 38. The intermediate gear 62 has an input face 66 and an output face 68. The input face 66 is associated with a first cam mechanism 70, such as a plurality of angularly spaced apart impact ramps 106 (FIG. 4), for generating reciprocating motion for the output shaft 44. An intermediate pinion 72 is mounted on intermediate shaft 64 to rotate together with intermediate gear 62 about the intermediate shaft central axis. Intermediate pinion 72 drives output gear 42, and causes gear reduction between intermediate shaft 64 and output shaft 44.

Although the intermediate gear 62 is shown rotationally engaged with armature pinion 38, it is to be appreciated that intermediate gear 62 may alternatively be driven via another intermediate gear and pinion between the intermediate gear 62 and armature pinion 38 or several gears and pinions to provide multiple gear reductions. Further, it is to be appreciated that although intermediate pinion 72 is shown to be rotationally engaged with output gear 42, output gear 42 may be alternatively driven via another gear or gears between intermediate pinion 72 and output gear 42.

With continuing reference to FIGS. 2–4, a second cam mechanism 80, such as angularly spaced apart impact ramps 108, is affixed to housing 12 via bearing plate 36. Second cam mechanism 80 is axially spaced from first cam mechanism 70. First and second cam mechanisms 70 and 80, respectively, are engageable by sufficient axial displacement of output shaft 44 so that output gear impact face 82 abuts the intermediate gear output face 68. Further displacement of output shaft 44 will displace intermediate gear 62 so that first and second cam mechanisms 70 and 80, respectively, abut each other.

In any arrangement of intermediate gear assembly 40, reciprocating motion is transmitted by face contact of the appropriate gears. It is to be appreciated that there are alternatives to gear face contact that would be apparent to one of ordinary skill in the art. For example, a disk fixed about output gear midsection 50 could abut intermediate gear output face 68 to perform the same function as output gear impact face 82.

First and second cam mechanisms 70 and 80, respectively, are configured with respect to each other to generate reciprocating motion and cause intermediate gear 62 to reciprocate axially as first cam mechanism 70 rotates relative to second mechanism 80. One way to achieve this is through the cooperation of impact ramps 106 and 108. Output face 68 of intermediate gear 62 transmits the reciprocating motion to impact face 82 of output gear 42. Input face 66 of intermediate gear 62 defines a spring seat 100. Cam mechanisms 70 and 80 can alternately be disengaged using an adjusting Roo 88 similar to rod which acts upon intermediate shaft 64. A suitable biasing means or spring 102, such as a Belleville washer, wave washer or the like is positioned on seat 100 and urges the first and second cam mechanisms, 70 and 80 respectively, away from engagement. The cam mechanisms are engageable by displacing the intermediate gear 62 against the bias of spring 102.

It is to be appreciated that first and second cam mechanisms 70 and 80, respectively, are shown as angularly spaced apart impact ramps 106 and 108, respectively. However, there are many possible configurations for first and second cam mechanisms 70 and 80, respectively, that would produce the desired reciprocating motion. For example, the second cam mechanism 80 may be fixed relative to the housing 12, or may rotate with some component of the gear train so long as the motion of the first cam mechanism 70 with respect to the second cam mechanism 80 produces reciprocating motion when the first and second cam mechanisms, 70 and 80 respectively, are engaged. The first cam mechanism 70 may be formed integral with the intermediate gear 62.

The first and second cam mechanisms, 70 and 80 respectively, are preferably configured to mate with each other. This means that the contact of the impact ramps 106 and 108 is maximized when in hammer drilling mode.

With continuing reference to FIGS. 2–4, an adjusting mechanism 86 for switching between conventional drill action and hammer drill action by rotation of an adjusting rod 88 will be described. The adjustment mechanism 86 operates in a manner similar to that shown in U.S. Pat. No. 5,447,205 incorporated herein by reference for the purpose of describing the adjustment mechanism 86. Bearing plate 36 receives second end 48 of output shaft 44 in hole 90. Second end 48 of output shaft 44 is supported by a needle or ball bearing 92. Bearing plate 36 has an opening or pivot hole 94 in communication with hole 90 and thus in communication with a second end 48 of output shaft 44. The adjusting rod 88 is rotatably received in opening 94 and extends adjacent second end 48 of output shaft 44.

The adjusting rod 88 will allow or prevent the first and second cam mechanisms 70 and 80, respectively, from abutting each other. Pivot hole 94 is shown oriented normal to output shaft axis 52 and receives adjusting rod 88. The adjusting rod 88 fits within the pivot hole 94 with enough clearance to allow rod 88 to rotate.

Adjusting rod 88 has a drill cam 96 and an impact cam 98 for alternately biasing output shaft 44 to selected axial positions. Drill cam 96 is sized to prevent engagement of the first and second cam mechanisms 70 and 80, respectively when the adjusting rod 88 is rotated into a position such that the drill cam 96 is adjacent second end 48 of the output shaft 44 (FIG. 2). Impact cam 98 is recessed deeper than drill cam 96 to allow engagement of first and second cam mechanism 70 and 80, respectively, when the adjusting rod 88 is rotated into a position such that impact cam 98 is adjacent second end 48 of output shaft 44 (FIG. 3).

Preferably, the second end 48 of output shaft 44 has a thrust bearing 104 mounted thereon. Thrust bearing 104 facilitates rotation of output shaft 44.

In a preferred embodiment of the present invention, in the hammer drilling mode, the motor 18 rotates at about 26,000 rpm. Armature pinion 38 has about seven teeth, while intermediate gear 62 has about thirty-nine teeth. This produces a gear ratio of intermediate gear 62 to armature pinion 38 of about 5.5 to 1. As a result, the intermediate shaft 64 rotates at about 4700 rpm. Intermediate pinion 72 has about nine or ten teeth, while output gear 42 has about thirty-nine or forty teeth. This produces a gear ratio of output gear 42 to intermediate pinion 72 of about 4 to 1. The output shaft 44 rotates at about 1000 to 1200 rpm depending on the gear ratios and motor speed.

The first cam mechanism 70 rotates with intermediate shaft 64 and preferably has about 11 to 13 impact ramps to produce approximately 60,000 BPM (blows per minute) while maintaining a reduced output shaft speed.

Figure 5:
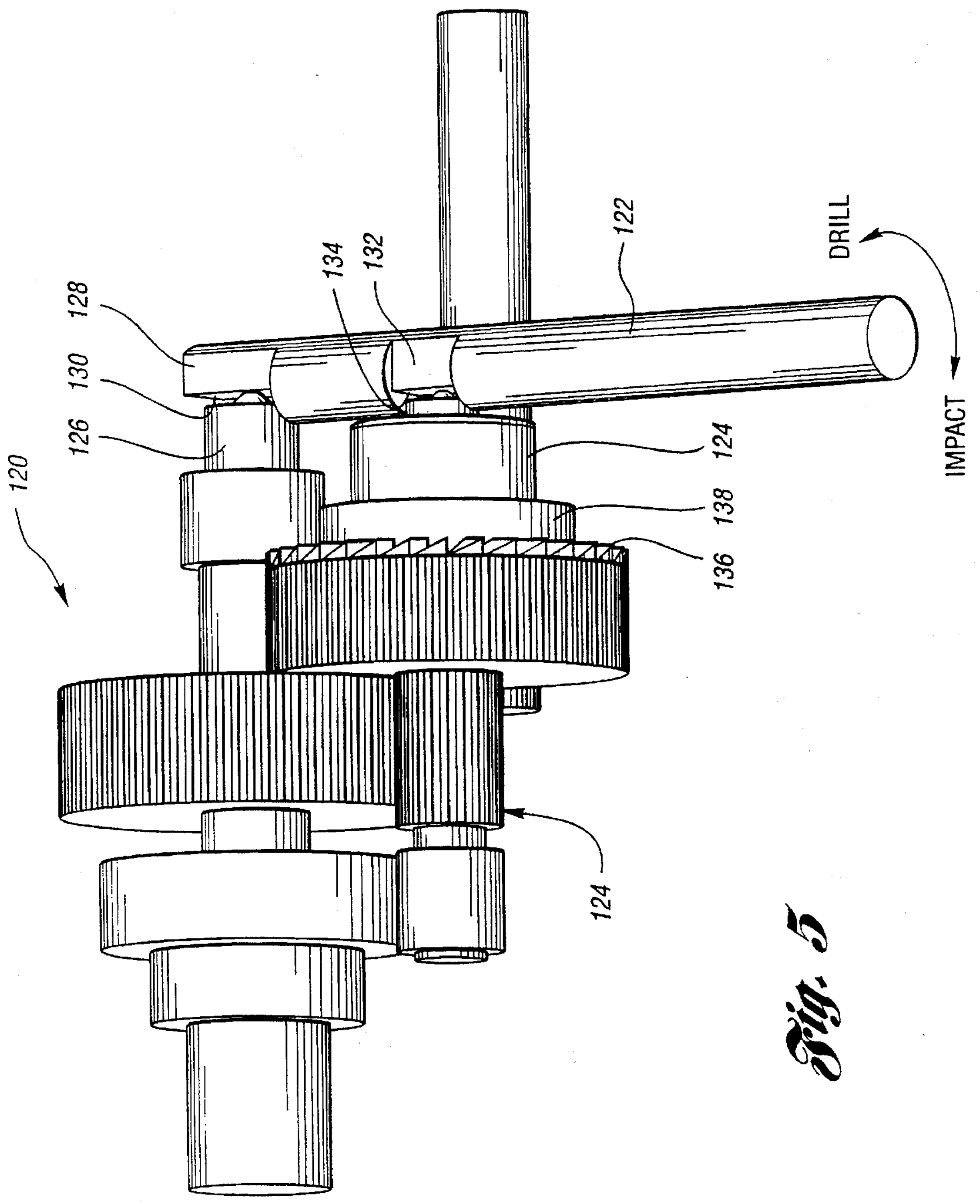
FIG. 5 is a perspective view of an alternative import mechanism for a hammer drill.

An alternative impact mechanism 120 is illustrated in FIG. 5. Rather than using a spring as a biasing mechanism to urge the first and second cam mechanisms apart as in the first embodiment described with reference to FIGS. 1–4, impact mechanism 120 utilizes an adjustment rod 122 which acts upon intermediate shaft 124 and output shaft 126 as described with reference to the first hammer drill embodiment. Adjusting rod 122 is provided with a first drill cam 128 and a first impact cam 130 which alternately acts upon an end of output shaft 126. Adjusting rod 122 is further provided with a second drill cam 132 and a second impact cam 134 which act upon the end of intermediate shaft 24. When the adjustment rod is rotated to the impact position, impact mechanism 120 works similar to the impact mechanism in the first embodiment described with reference to FIGS. 2 and 3. When the adjustment rod 122 is rotated to the drill position, second drill cam 132 urges intermediate shaft 124 axially sufficient to disengage first cam mechanism 136 from second cam mechanism 138. While the second impact mechanism 120 is a little more costly to manufacture than the impact mechanism used in the first embodiment, it is believed that the second embodiment will eliminate any problems which could occur if the biasing spring to wear or lose its elasticity.

It is to be appreciated that the present invention accomplishes the desired high blows per minute (BPM) for efficient hammer drill performance without requiring an undesirable high output speed or costly two-speed gear train. This is accomplished by incorporating the impact mechanism into an intermediate gear instead of the output gear. By allowing this stage to make face contact with the output gear, transmitting the hammering action to the output shaft and chuck, hammer action is achieved. Because of the higher rpm at the intermediate stage, the number of ramps that control the axial movement of the intermediate gear, which produces the hammering action, can be reduced. This allows a greater degree of ramp surface area contact with every revolution and reduces the "skipping" effect.

An added benefit of this design is to allow for a shorter distance between the armature bearing 32 and the first stage gear since the output gear receives its reciprocating motion from the intermediate gear. Prior art hammer drills that employ gear reduction orient the intermediate gear in a manner so that the pinion is rearward of the larger gear because the output gear includes the cam mechanism. Allowing for the pinion to be placed forward of the intermediate stage gear reduces the bending moment, reduces wear of the armature pinion and mating gear, and reduces the load on the bearing. It is to be appreciated that the present invention could be used in a multiple stage gear reduction hammer drill. By allowing the intermediate gear having the impact mechanism to make face contact with the output gear or an interposing gear which contacts the output gear or an equivalent motion transmitting member, high blows per minute (BPM) are achieved.

While the best mode for carrying out the invention has been described in detail, those familiar with the art to which this invention relates will recognize various alternative designs and embodiments for practicing the invention as defined by the following claims.

What is claimed is:

1. A hammer drill comprising:

a housing;

a motor disposed in the housing and having a rotatable armature shaft, the armature shaft having an armature pinion at one end;

an axially displaceable output shaft having a first end, a second end, a midsection between said ends, and an axis of rotation, the first end being adapted to receive a drill chuck;

an output gear fixed about the midsection of the output shaft to rotate coaxially therewith, the output gear having an impact face;

an intermediate shaft having a central axis;

an axially displaceable intermediate gear mounted on the intermediate shaft and driven by the armature pinion, the intermediate gear having an input face and an output face, the input face being associated with a first cam mechanism for generating reciprocating motion, the output face being engageable with the impact face of the output gear to transmit axial displacement therebetween, the output face engaging the impact face when the output gear is axially displaced toward the intermediate gear;

an intermediate pinion mounted on the intermediate shaft to rotate with the intermediate gear, the intermediate pinion driving the output gear and causing gear reduction between the intermediate shaft and the output shaft; and a second cam mechanism affixed to the housing and axially spaced from the first cam mechanism, the first and second cam mechanisms being engageable by sufficiently axially displacing the output shaft so that the output gear impact face abuts the intermediate gear output face axially displacing the intermediate gear so that the first and second cam mechanisms abut each other, wherein the first and second cam mechanisms are configured with respect to each other to generate reciprocating motion and cause the intermediate gear to reciprocate axially as the first cam mechanism rotates relative to the second cam mechanism while the first and second cam mechanisms are engaged, causing the output face of the intermediate gear to transmit the reciprocating motion to the impact face of the output gear thereby axially reciprocating the output shaft as it rotates.

2. The hammer drill of claim 1 further comprising:

a biasing mechanism acting on the intermediate gear to urge the first and second cam mechanisms away from engagement.

3. The hammer drill of claim 2 further comprising:

a bearing plate fixed to the housing, the bearing plate receiving the second end of the output shaft and defining an opening in communication with the second end of the output shaft; and a rotatable adjusting rod received in the opening and extending adjacent the second end of the output shaft, the adjusting rod having a first drill cam and a first impact cam for alternately biasing the output shaft to selected axial positions, the first drill cam being sized to position the output shaft so as to prevent engagement of the first and second cam mechanisms when the adjusting rod is rotated into a position such that the first drill cam is adjacent the second end of the output shaft, the first impact cam being sized to position the output shaft so as to allow engagement of the first and second cam mechanisms when the adjusting rod is rotated into a position such that the first impact cam is adjacent the second end of the output shaft.

4. The hammer drill of claim 3 wherein the biasing mechanism further comprises a spring acting on the intermediate gear urging the first and second cam mechanisms apart while being compressible allowing the first and second cam mechanisms to be engaged by urging the intermediate gear axially overcoming a force of the spring.

5. The hammer drill of claim 3 wherein the biasing mechanism comprises a second drill cam formed on the rotatable adjusting rod and a second impact cam formed on the rotatable adjusting rod for alternatively biasing the intermediate shaft between two axial positions, the second drill cam positioning the intermediate shaft so that the first and second cam mechanisms are disengaged and the second impact cam positioning the intermediate shaft so that the first and second cam mechanisms are capable of engaging one another.

6. The hammer drill of claim 1 wherein the first cam mechanism includes a plurality of ramps angularly spaced about the input face of the intermediate gear.

7. The hammer drill of claim 1 wherein the first cam mechanism includes a plurality of ramps angularly spaced about the input face of the intermediate gear, and the second cam mechanism includes a plurality of angularly spaced ramps configured to mate with the first cam mechanism.

8. The hammer drill of claim 1 wherein the armature pinion rotationally engages the intermediate gear, and the intermediate pinion rotationally engages the output gear.

9. An impact mechanism for a hammer drill, the hammer drill having a housing with a motor disposed therein, the motor including a rotatable armature shaft having an armature pinion at one end, the impact mechanism comprising:

an axially displaceable output shaft having a first end, a second end, a midsection between said ends, and an axis of rotation, the first end being adapted to receive a drill chuck;

an output gear fixed about the midsection of the output shaft to rotate coaxially therewith, the output gear having an impact face;

an intermediate shaft having a central axis;

an axially displaceable intermediate gear mounted on the intermediate shaft and driven by the armature pinion, the intermediate gear having an input face and an output face, the input face being associated with a first cam mechanism for generating reciprocating motion, the output face being engageable with the impact face of the output gear to transmit axial displacement therebetween, the output face engaging the impact face when the output gear is axially displaced toward the intermediate gear;

an intermediate pinion mounted on the intermediate shaft to rotate with the intermediate gear, the intermediate pinion driving the output gear and causing gear reduction between the intermediate shaft and the output shaft; and a second cam mechanism affixed to the housing and axially spaced from the first cam mechanism, the first and second cam mechanisms being engageable by sufficiently axially displacing the output shaft so that the output gear impact face abuts the intermediate gear output face axially displacing the intermediate gear so that the first and second cam mechanisms abut each other, wherein the first and second cam mechanisms are configured with respect to each other to generate reciprocating motion and cause the intermediate gear to reciprocate axially as the first cam mechanism rotates relative to the second cam mechanism while the first and second cam mechanisms are engaged, causing the output face of the intermediate gear to transmit the reciprocating motion to the impact face of the output gear thereby axially reciprocating the output shaft as it rotates.

10. The impact mechanism of claim 9 further comprising:

a biasing mechanism acting on the intermediate gear to urge the first and second cam mechanisms away from engagement.

11. The impact mechanism of claim 10 further comprising:

a bearing plate fixed to the housing, the bearing plate receiving the second end of the output shaft and defining an opening in communication with the second end of the output shaft; and a rotatable adjusting rod received in the opening and extending adjacent the second end of the output shaft, the adjusting rod having a first drill cam and a first impact cam for alternately biasing the output shaft to selected axial positions, the first drill cam being sized to position the output shaft so as to prevent engagement of the first and second cam mechanisms when the adjusting rod is rotated into a position such that the first drill cam is adjacent the second end of the output shaft, the first impact cam being sized to position the output shaft so as to allow engagement of the first and second cam mechanisms when the adjusting rod is rotated into a position such that the first impact cam is adjacent the second end of the output shaft.

12. The impact mechanism of claim 11 wherein the biasing mechanism further comprises a spring acting on the intermediate gear urging the first and second cam mechanisms apart while being compressible allowing the first and second cam mechanisms to be engaged by urging the intermediate gear axially, overcoming a force of the spring.

13. The impact mechanism of claim 11 wherein the biasing mechanism comprises a second drill cam formed on the rotatable adjusting rod and a second impact cam formed on the rotatable adjusting rod for alternatively biasing the intermediate shaft between two axial positions, the second drill cam positioning the intermediate shaft so that the first and second cam mechanisms are disengaged and the second impact cam positioning the intermediate shaft so that the first and second cam mechanisms are capable of engaging one another.

14. The impact mechanism of claim 9 wherein the first cam mechanism includes a plurality of ramps angularly spaced about the input face of the intermediate gear.

15. The impact mechanism of claim 9 wherein the first cam mechanism includes a plurality of ramps angularly spaced about the input face of the intermediate gear, and the second cam mechanism is fixed relative to the housing and includes a plurality of angularly spaced ramps configured to mate with the first cam mechanism.

16. The impact mechanism of claim 9 wherein the armature pinion rotationally engages the intermediate gear, and the intermediate pinion rotationally engages the output gear.

17. A hammer drill comprising:

a housing;

a motor disposed in the housing and having a rotatable armature shaft, the armature shaft having an armature pinion at one end;

an axially displaceable output shaft having a first end, a second end, a midsection between said ends, and an axis of rotation, the first end being adapted to receive a drill chuck;

an output gear fixed about the midsection of the output shaft to rotate coaxially therewith, the output gear having an impact face;

a bearing plate fixed to the housing, the bearing plate receiving the second end of the output shaft and defining an opening in communication with the second end of the output shaft;

an intermediate shaft having a central axis;

an axially displaceable intermediate gear mounted on the intermediate shaft and driven by the armature pinion, the intermediate gear having an input face and an output face, the input face being associated with a first cam mechanism for generating reciprocating motion, the output face being engageable with the impact face of the output gear to transmit axial displacement therebetween, the output face engaging the impact face when the output gear is axially displaced toward the intermediate gear;

an intermediate pinion mounted on the intermediate shaft to rotate with the intermediate gear, the intermediate pinion driving the output gear and causing gear reduction between the intermediate shaft and the output shaft;

a second cam mechanism affixed to the housing and axially spaced from the first cam mechanism, the first and second cam mechanisms being engageable by sufficiently axially displacing the output shaft so that the output gear impact face abuts the intermediate gear output face axially displacing the intermediate gear so that the first and second cam mechanisms abut each other;

a spring biasing the intermediate gear to urge the cam mechanisms away from engagement, the cam mechanisms being engageable by displacing the intermediate gear against the bias of the spring; and a rotatable adjusting rod received in the bearing plate opening and extending adjacent the second end of the output shaft, the adjusting rod having a drill cam and an impact cam for alternately biasing the output shaft to selected axial positions, the drill cam being sized to position the output shaft so as to prevent engagement of the first and second cam mechanisms when the adjusting rod is rotated into a position such that the drill cam is adjacent the second end of the output shaft, the impact cam being sized to position the output shaft so as to allow engagement of the first and second cam mechanisms when the adjusting rod is rotated into a position such that the impact cam is adjacent the second end of the output shaft, wherein the first and second cam mechanisms are configured with respect to each other to generate reciprocating motion and cause the intermediate gear to reciprocate axially as the first cam mechanism rotates relative to the second cam mechanism while the first and second cam mechanisms are engaged, causing the output face of the intermediate gear to transmit the reciprocating motion to the impact face of the output gear thereby axially reciprocating the output shaft as it rotates.

18. The hammer drill of claim 17 wherein the second cam mechanism is fixed relative to the housing.

19. The hammer drill of claim 18 wherein the first cam mechanism includes a plurality of ramps angularly spaced about the input face of the intermediate gear, and the second cam mechanism includes a plurality of angularly spaced ramps configured to mate with the first cam mechanism.

20. The hammer drill of claim 19 wherein the armature pinion rotationally engages the intermediate gear, and the intermediate pinion rotationally engages the output gear.

* * * * *